(12) United States Patent
Cheng et al.

(10) Patent No.: US 9,739,888 B2
(45) Date of Patent: Aug. 22, 2017

(54) METHOD, SYSTEM AND DEVICE FOR POSITION DETERMINATION WITH PREDICTED EPHEMERIS

(71) Applicant: Marvell World Trade Ltd., St. Michael (BB)

(72) Inventors: Jian Cheng, Guangzho (CN); Zhike Jia, Fremont, CA (US); Zhicui Lu, Shanghai (CN); Jian Chen, Shanghai (CN)

(73) Assignee: MARVELL WORLD TRADE LTD., St. Michael (BB)

( * ) Notice: Subject to any disclaimer, the term of this patent is extended or adjusted under 35 U.S.C. 154(b) by 364 days.

(21) Appl. No.: 14/469,679

(22) Filed: Aug. 27, 2014

(65) Prior Publication Data

US 2015/0070211 A1    Mar. 12, 2015

Related U.S. Application Data

(60) Provisional application No. 61/876,971, filed on Sep. 12, 2013.

(51) Int. Cl.
*G01S 19/27* (2010.01)
*G01S 19/25* (2010.01)

(52) U.S. Cl.
CPC ............ *G01S 19/27* (2013.01); *G01S 19/258* (2013.01)

(58) Field of Classification Search
CPC ................................ G01S 19/27; G01S 19/258
See application file for complete search history.

(56) References Cited

U.S. PATENT DOCUMENTS

| 8,120,529 | B2 * | 2/2012 | Bar-Sever | G01S 19/27 342/357.66 |
| 2008/0238765 | A1 * | 10/2008 | Zhang | G01S 19/05 342/357.62 |
| 2009/0315773 | A1 * | 12/2009 | Tomita | G01S 19/05 342/357.62 |
| 2010/0127929 | A1 * | 5/2010 | Uchida | G01S 19/27 342/357.66 |
| 2012/0146849 | A1 * | 6/2012 | Xu | G01S 19/05 342/357.29 |

\* cited by examiner

*Primary Examiner* — Cassie Galt

(57) ABSTRACT

Method, system, and device are provided for position determination with the use of predicted ephemeris to reduce the time-to-first-fix. The method includes: in a device, receiving broadcast orbit data and clock states from a plurality of satellites to determine first assistance data for the plurality of satellites, and numerically predicting first ephemeris for the plurality of satellites using the first assistance data. The method also includes: in a server system, receiving precise orbit data and accurate satellite clock states from a global GNSS service network to determine second assistance data; in a device, receiving the second assistance data and numerically predicting second ephemeris using the second assistance data. The method further includes: in a device, receiving satellite signals from a plurality of satellites, checking the period of validity of the first predicted ephemeris and the second predicted ephemeris respectively to select a predicted ephemeris from both the first predicted ephemeris and the second predicted ephemeris.

20 Claims, 4 Drawing Sheets

METHOD, SYSTEM AND DEVICE FOR POSITION DETERMINATION WITH PREDICTED EPHEMERIS

CROSS-REFERENCE TO RELATED APPLICATIONS

This disclosure claims priority to and benefit from U.S. Provisional Patent Application No. 61/876,971, filed on Sep. 12, 2013, the entirety of which is incorporated herein by reference.

FIELD

This disclosure relates to satellite based positioning systems. More specifically, the disclosure relates to method, system, and device for position determination with the use of predicted ephemeris to reduce the time-to-first-fix.

BACKGROUND

The satellite signals from Global Navigation Satellite Systems (GNSS), such as Global Positioning System (GPS), GLONASS, Galileo, and COMPASS are currently available for mobile devices, also referred to as GNSS-enabled devices, itself. The GNSS signals include ranging signals, used to measure the pseudo-range to the satellite, and navigation messages. The navigation message consists of three major components. The first part contains the GNSS date and time, plus the satellite's status and an indication of its health. The second part contains orbital information and allows the GNSS-enabled device to calculate the position of the satellite. The third part, called the almanac, contains information and status concerning all the satellites; their locations and pseudorandom noise numbers. The GNSS-enabled device may receive signals from a sufficient number of GNSS satellites, extract the necessary navigation message from the signals, and then use the navigation message in conjunction with ranging signals to provide position, velocity, and timing services, and the related applications. An important performance index of the satellite based positioning systems is the time-to-first-fix (TTFF). The TTFF is the time required for the GNSS-enabled device to acquire the satellite signals and calculates its position under a variety of conditions. For best user experience however, it is desirable that TTFF be minimized.

Ephemeris transmitted from a satellite is known as broadcast ephemeris. The broadcast ephemeris contains the orbital information of the satellite and the period of validity of this orbital information. In general, the broadcast ephemeris is only valid for a four hour period. The broadcast ephemeris describe a Keplerian-like set of orbital elements with additional corrections that then allow the satellite's position to be calculated in an Earth-centered-Earth-fixed (ECEF) Cartesian coordinates at any time during the period of validity of the broadcast ephemeris. When the validity period for the previously obtained broadcast ephemeris has expired, the GNSS-enabled device is required to retrieve current broadcast ephemeris as the GNSS-enabled device needs to calculate the satellite state. Typically, the current broadcast ephemeris can be obtained as direct broadcast from a GNSS satellite. Alternatively, satellite ephemeris may be received from a server in real time. Real time deliver real broadcast ephemeris that is being observed concurrently by a neighboring receiver's station, or by a network of reference receiver's station that relay to a data center all the current broadcast ephemeris received from every satellite in view at each reference receiver's station. Further, the GNSS-enabled device is in a position from which it can obtain the broadcast ephemeris from a GNSS satellite and properly demodulate the signal, the process of receiving and demodulating increases substantially to the processing time. The additional processing time certainly increases the TTFF while increasing the power consumption of the GNSS-enabled device.

Accordingly, there is a need in the art for the GNSS-enabled device that determines position, velocity, and timing services by making the ephemeris for future times available to the device.

SUMMARY

In accordance with the teachings described herein, methods, systems, and devices are provided for position determination. A device includes a memory configured to store the most recently obtained broadcast orbit data and clock states in a first memory section; the first Earth Orientation Parameter data in a second memory section; the first assistance data in a third memory section; the first predicted ephemeris in a fourth memory section; the second assistance data in a fifth memory section; and the second predicted ephemeris in a sixth memory section. The device also includes: a data generator operable to produce first assistance data using the most recently obtained broadcast orbit data and clock states stored in first section of the memory; an ephemeris predictor operable to produce first predicted ephemeris using the first assistance data stored in third section of the memory and second predicted ephemeris using the second assistance data stored in fifth section of the memory; an ephemeris selector operable to select a predicted ephemeris from the first predicted ephemeris stored in fourth section of the memory and the second predicted ephemeris stored in sixth section of the memory based on validity interval check; and a position determination system adapted to use the selected predicted ephemeris in a determination of a position for the device.

In one embodiment, a system for position determination includes a storage medium and a processor. The storage medium is configured to comprise: a first storage medium section storing the precise orbit data and accurate clock states that is reported periodically by a global GNSS service network; a second storage medium section storing the Earth Orientation Parameter values that is reported periodically by a few agencies; a third storage medium section storing software code for a generation of the second assistance data; and a fourth storage medium section storing the second assistance data calculated in accordance with the software code stored in third section of the storage medium. The processor is operable to calculate second assistance data in accordance with the software code stored in third section of the storage medium.

In another embodiment, a method is provided for position determination that includes: in a device, receiving broadcast orbit data and clock states from a plurality of satellites to determine first assistance data for the plurality of satellites, storing the first assistance data, and numerically predicting first ephemeris for the plurality of satellites using the first assistance data; in a system, receiving precise orbit data and accurate satellite clock states from a global GNSS service network to determine second assistance data, and storing the second assistance data; in a device, receiving the second assistance data, storing the second assistance data, and numerically predicting second ephemeris using the second assistance data.

In yet another embodiment, a method is provided for position determination that includes: in a device, receiving satellite signals from a plurality of satellites, selecting a predicted ephemeris from the first predicted ephemeris and the second predicted ephemeris for the plurality of satellites based on the validity interval check and calculating a position for the device using the received satellite signals and the selected predicted ephemeris.

DETAILED DESCRIPTION

Figure 1:
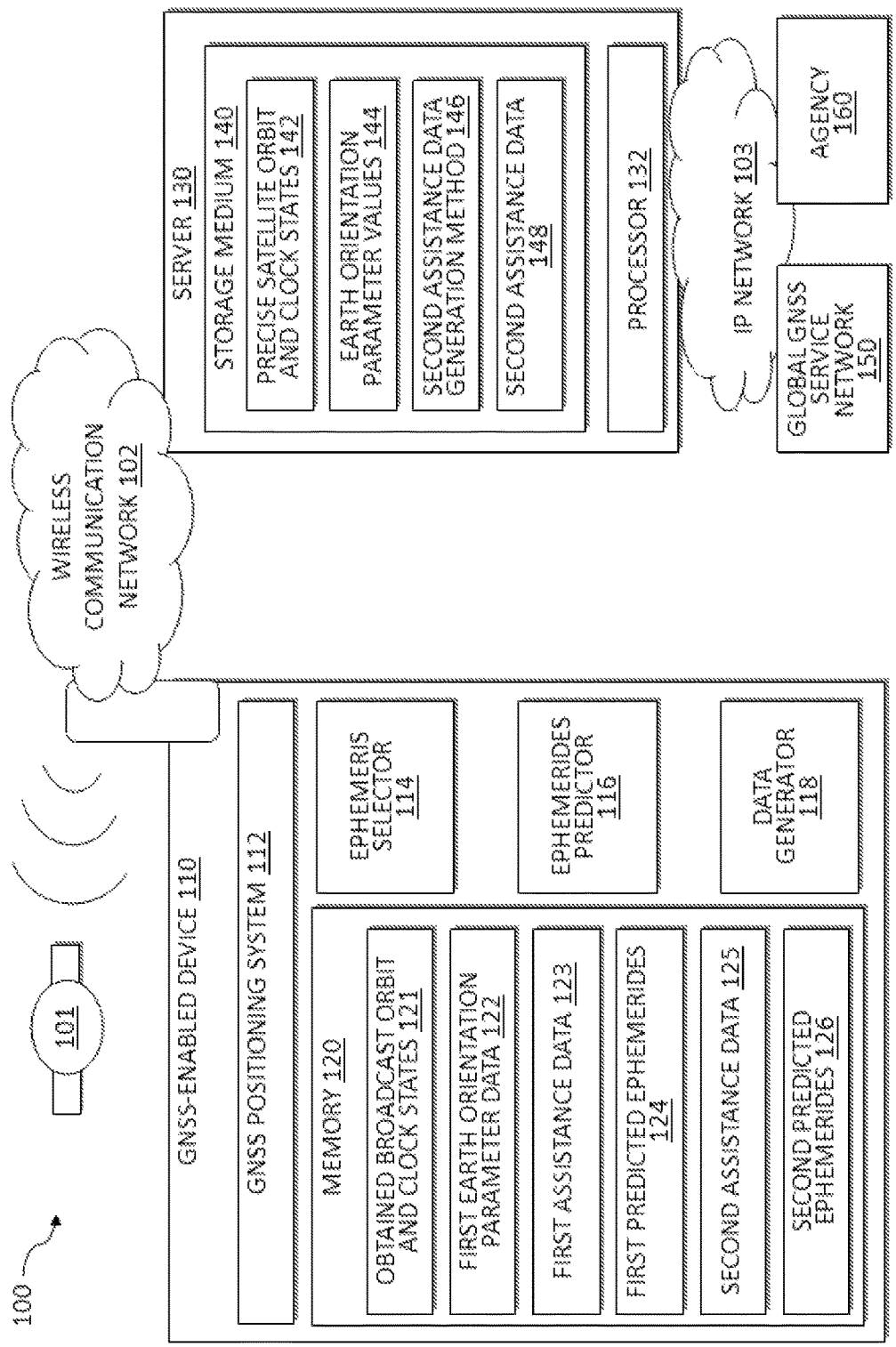
FIG. 1 is a block diagram showing an exemplary architecture of a positioning system according to an embodiment of the disclosure.

FIG. 1 is a block diagram showing an exemplary architecture of a positioning system 100. As illustrated, system 100 includes a plurality of components, each of which acts to provide specific functionality. These components include software which is stored in a storage and then executed on a processor to provide the functionality, hardware which is adapted to provide the component's functionality, or a combination of software and hardware which is working together to provide the component's functionality. The depicted architecture may be adapted to illustrate any one of the exemplary flow diagrams with reference to FIGS. 2 through 4, or any number of other processes within the scope of this disclosure.

In the FIG. 1 example, a GNSS-enabled device 110 includes a GNSS positioning system 112 comprising a radio frequency (RF) module (not shown) in which the GNSS signals are acquired, and a digital processing module (not shown) in which the ranging signals and navigation messages are extracted. In an example, parts of the software code in digital processing module may be shared with an application processor (not shown) in the device. In this host-based mode, both the application processor and the GNSS positioning system calculate positions by running in parallel. The application processor controls the GNSS positioning system 112.

According to an embodiment of the disclosure, a user of the GNSS-enabled device 110 turns on the GNSS positioning system 112 to allow the device to provide position, velocity, and timing services. When the GNSS positioning system 120 is powered up, the RF module acquires satellite signals from a plurality of visible satellites 101 (for illustration clarity, only a single satellite is shown). During traditional operation, the digital processing module demodulates the GNSS signals from the visible satellites to retrieve broadcast orbit data for the satellites in view. The obtained broadcast orbit data allows the GNSS-enabled device 110 to calculate the positions of the visible satellites, which is used in combination with pseudo-range data to provide a position for the GNSS-enabled device 110.

Suppose GNSS-enabled device 110 had been used in a traditional operation such that the device was calculated its position at a first time using positions and velocities derived from the obtained broadcast orbit data from the satellites in view. The GNSS positioning system 112 stores the obtained broadcast orbit data and clock states in a memory 120. While the GNSS positioning system 112 attempt to calculate its position at a second time but be unable to retrieve current broadcast orbit data and clock states from the visible satellites due to the harsh operating environment, such as tall building and parking garages, an ephemeris predictor 116 operable to produce the ephemeris (comprising the orbit data and clock states) into the future from the previously stored ephemeris may provide the predicted or extended ephemeris to assist the GNSS positioning system 112 in a determination of a position for the device, thereby reduce the time-to-first-fix (TTFF).

A memory 120 embedded in the GNSS-enabled device 110 is configured to store the most recently obtained broadcast orbit data and clock states in section 121 of the memory. In an embodiment, the memory 120 can be a non-volatile memory such that the data it contains can be immediately used when there is a need in the art for the GNSS-enabled device 110 that determines position, velocity, and timing services. The records of broadcast orbit data and clock states older than a certain amount of days (e.g., 3 days) may be discarded. Consider the period of validity of broadcast orbit data, and without loss of accuracy, each broadcast orbit record can be expanded into several individual records by a configurable interval. For an example, in a case where the GPS satellite broadcast orbit data is valid for a two hour period, the configurable interval is 15 minutes, and therefore, 8 individual records for each broadcast orbit record can be expanded. The configurable interval may be different in accordance with different GNSS.

The memory 120 is also configured to store the first Earth Orientation Parameter (EOP) data in section 122 of the memory. The first EOP data includes a polar motion X, a polar motion Y, and a length of day (LOD). In an embodiment, the first EOP data is the predicted values, which is valid over a time into the future. A model for predicting the EOP data is based on a parametric fit to historic time series of measured EOP values, such as those being produced by the International Earth Rotation and Reference Systems Service (IERS) or the National Geo-spatial Agency (NGA). In an embodiment but not of limitation, the predictive mode is generated according to the execution of a power spectrum analysis of the historic time log (spanning nearly fifty years) and the selection of dominant frequencies, together with a long-term polynomial. Accordingly, the predictive model can be used to effectively extrapolate the historic time series into the future.

A data generator 118 in the GNSS-enabled device 110 is configured to produce a first assistance data. The first assistance data consists of a first orbit data and a first clock data. In an embodiment, the first assistance data can be generated by using the most recently obtained broadcast orbit data and clock states stored in section 121 of the memory. According to an embodiment of the disclosure, the data generator 118 stores software code for first orbit data generation and first clock data generation and is operable to calculate the first orbit data in accordance with the software code.

Specifically, the data generator 118 converts broadcast orbit data from the Keplerian model frame to the Earth-centered-Earth-fixed (ECEF) frame in order to produce, for each of visible satellites, initial orbital position and velocity condition, and then determines, for each of visible satellites, initial orbital dynamic parameters based on real broadcast orbit data. The orbital conditions and orbital dynamic parameters will be iteratively estimated through numerical integration of satellite equation of motion using appropriate force models. After the convergence (i.e., the currently calculated orbital position, velocity, and orbital dynamic parameters are sufficiently close to the broadcast orbit of that satellite.) is achieved, the data generator 118 outputs and stores, for each of visible satellites, the first orbit data in section 123 of the memory. The first orbit data can be invoked to generate orbit prediction at any time. The data generator 118 may also produce, for each of visible satellites, the first clock data through a quadratic polynomial model using the most recently obtained clock states stored in section 121 of the memory. The first clock data for each of visible satellites are stored in section 123 of the memory. They can be invoked to generate clock prediction at any time.

Once the first assistance data are produced, an ephemeris predictor 116 in the GNSS-enabled device 110 is configured to produce first predicted ephemeris for each of visible satellites included in the first assistance data. The first predicted ephemeris consists of a first orbit prediction and a first clock prediction. According to an embodiment of the disclosure, the ephemeris predictor 116 stores software code for first orbit prediction and first clock prediction and is operable to calculate the first orbit prediction and the first clock prediction in accordance with the software code.

Specifically, the ephemeris predictor 116 can calculate the future orbit of the satellites by numerically integrating the satellite equations of motion, starting from the first orbit data, and then convert the predicted orbit from ECI coordinates to ECEF coordinates using the first EOP data stored in section 121 of the memory. The ephemeris predictor 116 can also calculate the future clock states of the satellites based on a predictive model using the first clock data. The model of clock state prediction is a quadratic polynomial in time. These orbit and clock predictions are then used to fit the first predicted ephemeris in same representation as the broadcast ephemeris. It should be noted that the ephemeris can be predicted on any given interval and will cover the period of validity for a satellite. In an embodiment, in a case where the GPS broadcast ephemeris is only valid for a four hour period. To extend the capability beyond the four hour period, there is a need in the art for providing multiple ephemerides. 6 ephemerides for a satellite would be provided to describe the satellite state for one day. For other GNSS, the period of validity may be different, and accordingly, the amount of multiple ephemerides may also be different. The ephemeris predictor 116 outputs and stores the first predicted ephemeris in section 124 of the memory.

Usually, the GNSS-enabled device 110 is in a position at any given time from which it can sees only a fraction of the full GNSS constellation. For an example, in a case where the GPS satellites in view are roughly 30% of full GPS constellation. According to an embodiment of the disclosure, the broadcast ephemeris may be sampled several times every day to ensure optimal GNSS constellation sampling. However, due to a limitation on battery life or other operations, the GNSS-enabled device 110 is unable to observe and record broadcast ephemeris continuously.

A modern GNSS-enabled device 110 can incorporate functions of a GNSS satellite positioning, as well as of a cellular transceiver (not shown) or of a wireless transceiver (not shown). The GNSS-enabled device 110 can communicate wirelessly with a wireless communication network 102 by employing RF field propagation. In one embodiment, the wireless communication network 102 can be a cellular communication network. The GNSS-enabled device 110 uses RF signal to communicate with a cellular station (not shown) according to various cellular technologies, such as global system for mobile (GSM), code division multiple access (CDMA), wideband code division multiple access (WCDMA), and long term evolution (LTE) and the like. In another embodiment, the wireless communication network 102 can be a wireless local area network (LAN). The GNSS-enabled device 110 uses RF signal to communicate with an access point (not shown) according to various communication protocols, such as an Institute of Electrical and Electronics Engineers (IEEE) 802.11 based protocol (e.g., WiFi network).

In accordance with another embodiment of the disclosure, the input to the ephemeris predictor 116 may be augmented to include the assistance data from an external server system. Such assistance data can provide full GNSS constellation compared to the real observations in the GNSS-enabled device 110. Turning now to FIG. 1, an exemplary architecture of a positioning system 100 also includes a server system 130, a global GNSS service network 150, such as the International GNSS Service (IGS) providing the precise orbit data and accurate satellite clock states to the server system 130, and an agency 160, such as IERS or NGA providing the EOP values to the server system 130.

In the FIG. 1 example, the server system 130 can periodically receive from the global GNSS service network 150 precise orbit data and accurate satellite clock states through IP (Internet Protocol) network 103. The IP network 103 is a system by which data is sent from one host to another host through a network (e.g., the Internet). In accordance with an embodiment of the disclosure, the precise orbit data can be received four times per day. Alternatively, the accurate satellite clock states can be received one time per day. According to such embodiment, possible receiving intervals for precise orbit data and accurate satellite clock states could be a 6 hour interval and a 24 hour interval respectively. A storage medium 140 in the server system 130 is configured to periodically store the precise orbit data and accurate satellite clock states in section 142 of the storage medium. According to an embodiment of the disclosure, the records of precise orbit data and accurate satellite clock states older than a certain amount of days (e.g., 30 days) may be discarded. The server system 130 can also periodically receive from the agency 160 the EOP values through IP network 103. The EOP values include a polar motion X, a polar motion Y, a length of day (LOD), and UT1-UTC and can be stored in section 144 of the storage medium. According to an embodiment of the disclosure, the EOP values can be received one time per day (i.e., possible receiving intervals could be a 24-hour interval), and the records of EOP values older than a certain amount of days (e.g., 30 days) may be discarded.

A processor 132 in the server system 130 is configured to operate software code stored in section 146 of the storage medium to generate second assistance data. The second assistance data consists of a second orbit data, a second clock data, and a second EOP data. According to an embodiment of the disclosure, the processor 132 generates from the received EOP values stored in section 144 of the storage medium the second EOP data using a polynomial model. The polynomial model for generating second EOP data is based on a parametric fit to historic time series of received EOP values. According to another embodiment of the disclosure, the processor 132 generates from the received precise orbit data stored in section 142 of the storage medium the second orbit data, comprising: set the initial orbital position and velocity condition for each satellite; determine the initial orbital dynamic parameters for each satellite; convert the received precise orbit data from ECEF coordinates to ECI coordinates using second EOP data; iteratively estimate the orbital conditions and orbital dynamic parameters through numerical integration of satellite equation of motion using appropriate force models, until the convergence is achieved. The numerical integration can be done by any standard numerical integration method such as Runga-Kutta method or a multi-step-type method. The iterative estimation can be performed through a least squares fit to orbital conditions and orbital dynamic parameters. According to another embodiment of the disclosure, the processor 132 generates from the received accurate clock states stored in section 142 of the storage medium the second clock data using a quadratic polynomial model. The quadratic polynomial model for generating the second clock data is based on a parametric fit to historic time series of received accurate clock states. The processor 132 outputs and stores the second assistance data in section 148 of the storage medium.

In response to a request from the GNSS-enabled device 110 having access to the wireless communication network 102, there is a need in the art for the GNSS-enabled device 110 that determines position, velocity, and timing services by propagating the second assistance data available to the device. In an embodiment, the server system 130 prepares a message to the GNSS-enabled device 110 according to a network communication protocol (e.g., software for implementing communication protocol, such as the Transmission Control Protocol/Internet Protocol (TCP/IP), Hypertext Transfer Protocol (HTTP), etc.). The message carries the second assistance data. Then, the server system 130 propagates a signal corresponding to the message to the wireless station (e.g., the cellular station) through the telephony services and/or network (e.g., Internet) access, and the wireless station forwards the message to the GNSS-enabled device 110 via the wireless communication network 102.

After the GNSS-enabled device 110 received the second assistance data, it stores the second assistance data in section 125 of the memory. The ephemeris predictor 116 in the GNSS-enabled device 110 is configured to produce second predicted ephemeris for each satellite. The second predicted ephemeris consists of a second orbit prediction and a second clock prediction. According to an embodiment of the disclosure, the ephemeris predictor 116 stores software code for second orbit prediction and second clock prediction and is operable to calculate the second orbit prediction and the second clock prediction in accordance with the software code.

Specifically, the ephemeris predictor 116 can calculate the future orbit of the satellites by numerically integrating the satellite equations of motion, starting from the second orbit data, and then convert the predicted orbit from ECI coordinates to ECEF coordinates using the second EOP data. The ephemeris predictor 116 can also calculate the future clock states of the satellites based on a predictive model using the second clock data. The model of clock state prediction is a quadratic polynomial in time. These orbit and clock predictions are then used to fit the second predicted ephemeris in same representation as the broadcast ephemerides. The ephemeris predictor 116 outputs and stores the second predicted ephemeris in section 126 of the memory.

An ephemeris selector 114 in the GNSS-enabled device 110 is configured to select a predicted ephemeris from the first predicted ephemeris stored in section 124 of the memory and the second predicted ephemeris stored in section 126 of the memory based on the validity interval check. The validity interval check is performed based on the comparison of a first threshold interval with the period of validity of the first predicted ephemeris and the comparison of a second threshold interval with the period of validity of the second predicted ephemeris. When the period of validity of the first predicted ephemeris is less than the first threshold interval and the period of validity of the second predicted ephemeris is not less than the second threshold interval, the first predicted ephemeris can be selected. Alternatively, when the period of validity of the first predicted ephemeris is not less than the first threshold interval and the period of validity of the second predicted ephemeris is less than the second threshold interval, the second predicted ephemeris can be selected. Further details of validity checks will be discussed below in reference to FIG. 4. The GNSS positioning system 112 is adapted to use the selected predicted ephemeris in a determination of a position for the device in order to achieve the requirement for rapid time to fix.

Figure 2:
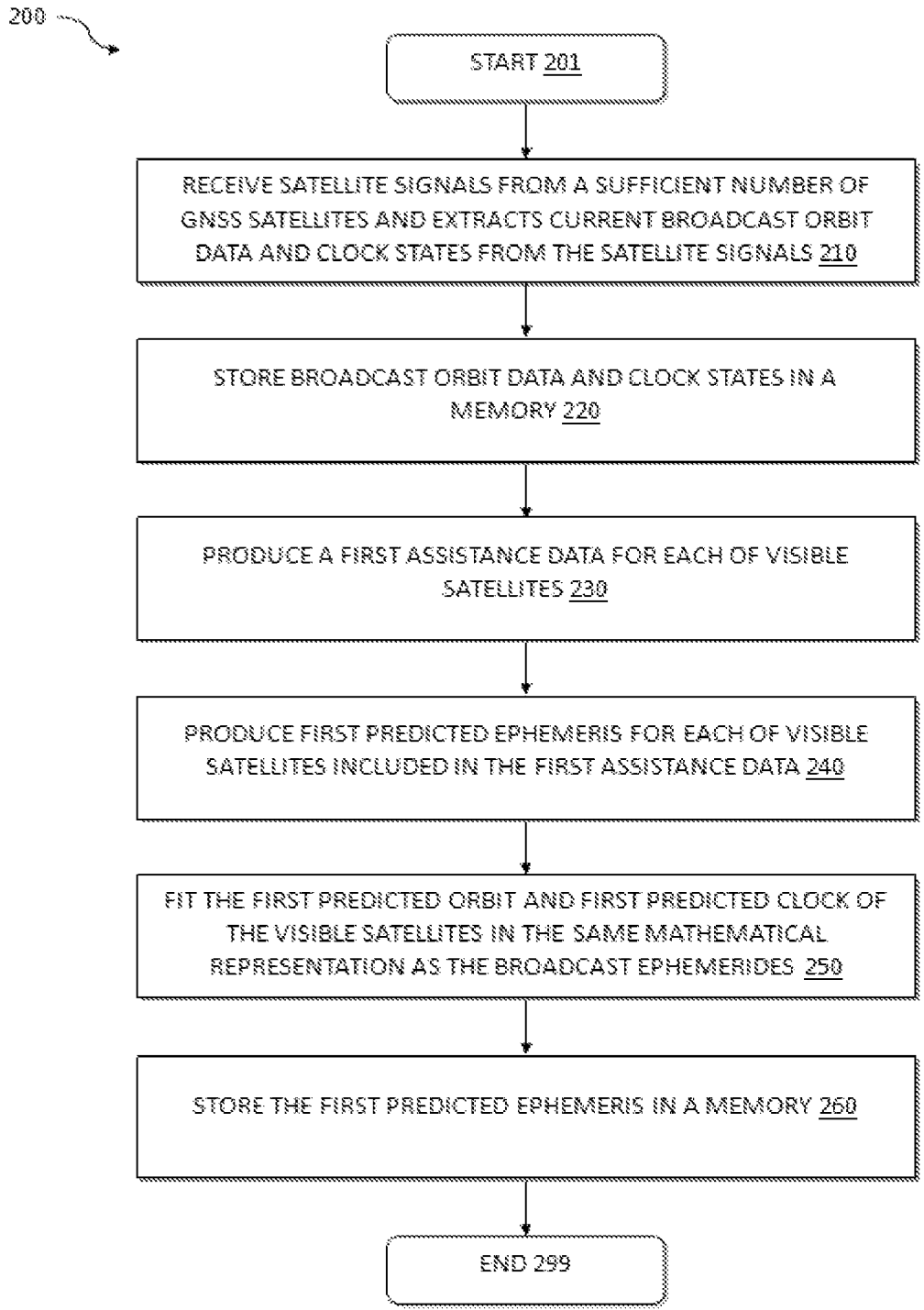
FIG. 2 is a flowchart showing a process example for generating first predicted ephemerides according to an embodiment of the disclosure.

FIG. 2 is a flowchart showing a process example 200 for generating first predicted ephemeris according to an embodiment of the disclosure. In an example, the process is executed by the data generator 118 and the ephemeris predictor 116 in the GNSS-enabled device 110. The process starts at 201 and proceeds to 210.

Suppose the GNSS positioning system 112 in the GNSS-enabled device 110 has just been powered up, it receives, by a RF module, satellite signals from a sufficient number of GNSS satellites and extracts current broadcast orbit data and clock states from the satellite signals at 210. It should be noted that a certain period of time is required to achieve the reception and extraction of the satellite signals. In response to the GNSS-enabled device 110 not having access to a wireless communication network 102, the GNSS positioning system 112 can calculate, at a time during the validity time period, a position for the device using positions and velocities derived from the obtained broadcast orbit data from the visible satellites, in conjunction with the pseudo-range data derived from the ranging signals associated with the visible satellites.

At 220, the GNSS positioning system 112 stores broadcast orbit data and clock states in section 121 of the memory. At 230, the data generator 118 can produce a first assistance data for each of visible satellites. The first assistance data comprise a first orbit data and a first clock data. The data generator 118 can produce the first orbit data by iteratively estimating the orbital conditions (comprising orbital position and velocity) and orbital dynamic parameters through numerical integration of satellite equation of motion using appropriate force models, until the convergence is reached. The estimation is aimed at minimizing the square of distance between the modeled orbit of the satellite and its broadcast orbit, both in Earth-Centered-Inertial (ECI) coordinates that is converted from ECEF coordinates using the first EOP data stored in section 121 of the memory, by adjusting initial orbital conditions and initial orbital dynamic parameters. The numerical integration can be done by any standard numerical integration method such as Runga-Kutta method or a multi-step-type method. Such iterative estimation can be performed through a least squares fit to orbital conditions and orbital dynamic parameters. The data generator 118 can further produce the first clock data by generating an initial set of clock states and estimating the accurate clock states using a quadratic polynomial model. At this point, while the data generator 118 performs the data generation, the GNSS positioning system 112 may be powered down or placed into inactive mode.

At 240, the ephemeris predictor 116 can produces first predicted ephemeris for each of visible satellites included in the first assistance data. The first predicted ephemeris comprises a first predicted orbit and a first predicted clock. The ephemeris predictor 116 produces the first predicted orbit by numerically integrating the satellite equations of motion based on storing the first orbit data in section 123 of the memory and converting the predicted orbit from an ECI coordinate system to an ECEF Cartesian coordinate based on storing the EOP data in section 122 of the memory. The ephemeris predictor 116 further produces the first predicted clock by a quadratic polynomial in time based on storing the first clock data in section 123 of the memory. At this point, while the ephemeris predictor 116 performs the prediction, the GNSS positioning system 112 may be powered down or placed into inactive mode.

At 250, the ephemeris predictor 116 fits the first predicted orbit and first predicted clock of the visible satellites in the same mathematical representation as the broadcast ephemerides. At 260, the ephemeris predictor 116 stores the first predicted ephemeris in section 124 of the memory. The process proceeds to 299 and terminates.

At a later time, when the GNSS positioning system 112 is powered up or brought into an active mode, it may calculate a position for the device using positions and velocities derived from the first predicted ephemeris from the visible satellites if there is no valid real broadcast orbit data available to the GNSS positioning system 112, in conjunction with the pseudo-range data derived from the ranging signals associated with the visible satellites. The prediction process with reference to FIG. 2 can be repeated whenever new broadcast orbit data and clock states from the satellite signals are ultimately demodulated by the GNSS positioning system 112.

Figure 3:
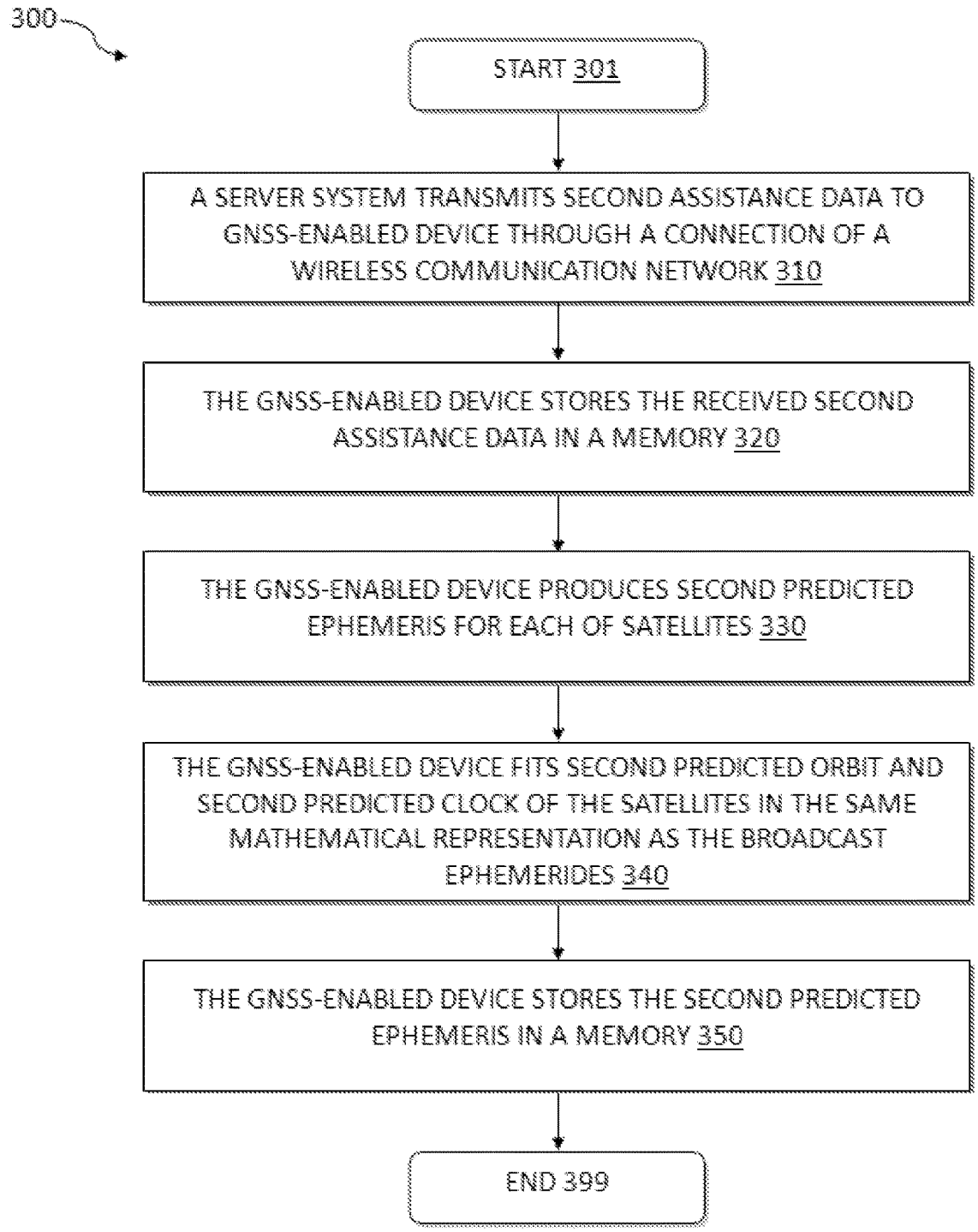
FIG. 3 is a flowchart showing a process example for generating second predicted ephemerides according to an embodiment of the disclosure.

FIG. 3 is a flowchart showing a process example 300 for generating second predicted ephemerides according to an embodiment of the disclosure. In an example, the process is executed by the ephemeris predictor 116 in the GNSS-enabled device 110. The process starts at 301 and proceeds to 310.

Suppose the GNSS positioning system 112 has just been powered up, a certain period of time is required to receive satellite signals from a sufficient number of GNSS satellites and extract current broadcast orbit data and clock states from the satellite signals. At 310, the server system 130 transmits a second assistance data through a connection of a wireless communication network 102, in response to an assistance-data request from the GNSS-enabled device 110. It should be noted that because the first assistance data are generated from the real satellite observations in the fully autonomous GNSS-enabled device 110, the second assistance data can provide a more complete view of the satellite constellation compared to the first assistance data. Therefore, the second assistance data can be applied to more satellites. At 320, the GNSS-enabled device 110 stores the received second assistance data in section 125 of the memory.

When the second assistance data provided by the server system 130 is used as input to ephemeris predictor 116, the ephemeris predictor 116 produces second predicted ephemeris at 330. The second predicted ephemeris comprises a second predicted orbit and a second predicted clock. The ephemeris predictor 116 can produce the second predicted orbit by numerically integrating the satellite equations of motion based on storing the second orbit data in section 125 of the memory and converting the predicted orbit from an ECI coordinate system to an ECEF Cartesian coordinate based on storing the second EOP data in section 125 of the memory. The ephemeris predictor 116 can further produce the second predicted clock by a quadratic polynomial in time based on storing the second clock data in section 125 of the memory. At this point, while the ephemeris predictor 116 performs the prediction, the GNSS positioning system 112 may be powered down or placed into inactive mode. At 340, the ephemeris predictor 116 fits the second predicted orbit and second predicted clock of the satellites in the same representation as the broadcast ephemerides. At 350, the ephemeris predictor 116 stores the second predicted ephemeris in section 126 of the memory. The process proceeds to 399 and terminates.

The GNSS positioning system 112 can calculate a position for the device using positions and velocities derived from the second predicted ephemeris from the satellites in view if there is no valid real broadcast orbit data available to the GNSS positioning system 112, in conjunction with the pseudo-range data derived from the ranging signals associated with the visible satellites. At a later time, when the GNSS positioning system 112 ultimately demodulated real broadcast orbit data and clock states from the satellite signals, the ephemeris predictor 116 can also produce the first predicted ephemeris using the prediction process with reference to FIG. 2. Further, the prediction process with reference to FIG. 3 can be repeated whenever new assistance data become available through the GNSS-enabled device 110 coupled to a wireless connection to send an assistance-data request to the server system 130. The new assistance data may be loaded into the device's memory as a second assistance data.

Figure 4:
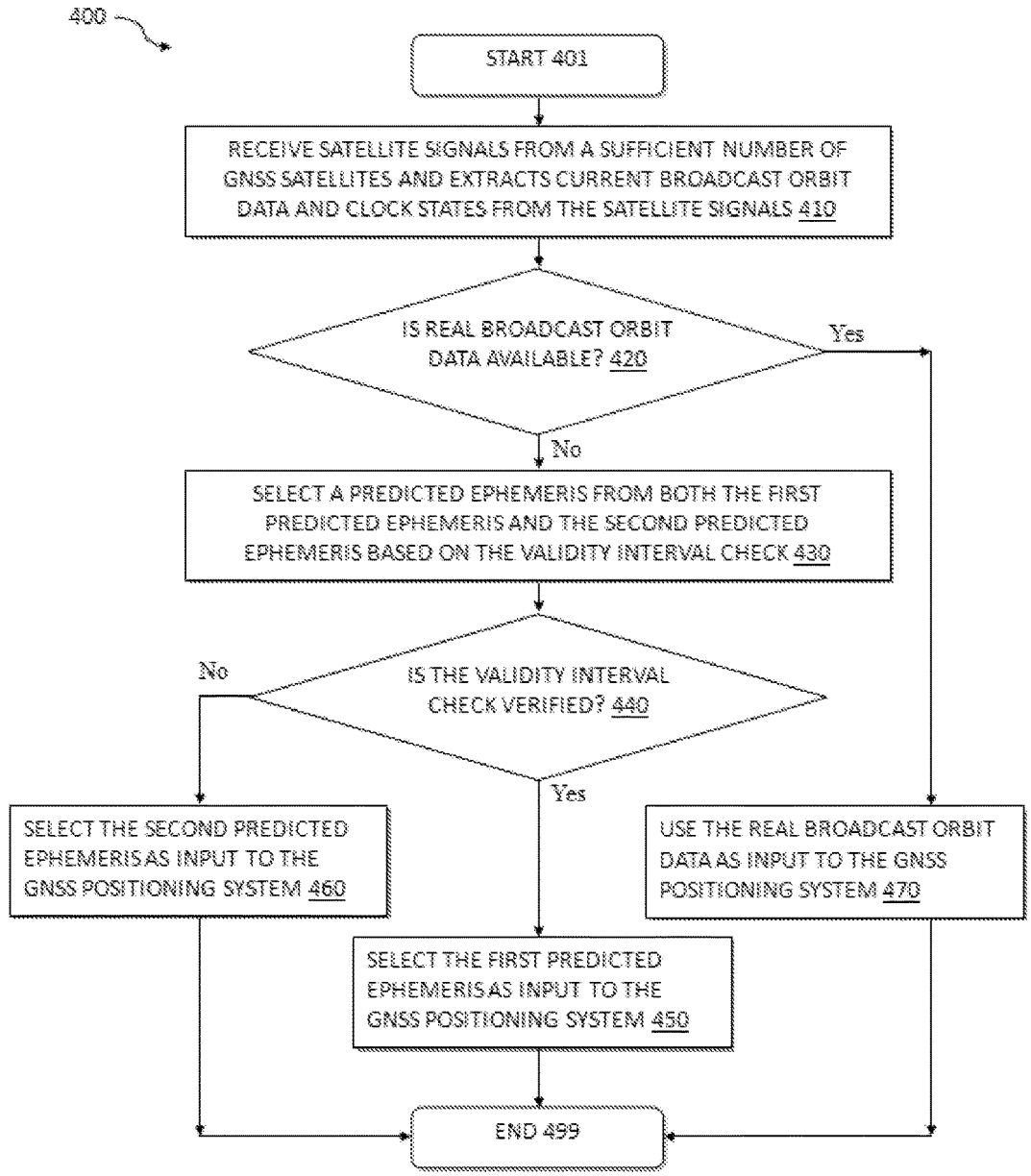
FIG. 4 is a flowchart showing a process example for position determination with the use of predicted ephemeris according to an embodiment of the disclosure.

FIG. 4 is a flowchart showing a process example 400 for position determination with the use of predicted ephemeris according to an embodiment of the disclosure. In an example, the process is executed by the GNSS positioning system 112 and the ephemeris selector 116 in the GNSS-enabled device 110. The process starts at 401 and proceeds to 410.

Suppose the GNSS positioning system 112 is powered up or brought into an active mode, the first predicted ephemeris and the second predicted ephemeris have previously been generated and stored in the GNSS-enabled device 110. Because the second assistance data from the server system 130 is produced on a more accuracy of the source data, the second assistance data enable the ephemeris predictor 116 to calculate more accurate predictions than data generator 118 on the GNSS-enabled device 110. In general, the predicted ephemeris can be provided for as long into the future as the orbit data can be reliably predicted. Although longer prediction periods are possible, the accuracy of orbit data prediction may be degraded due to longer prediction periods. According to an embodiment of the disclosure, the first predicted ephemeris is only valid for a period of approximately 14 days. According to another embodiment of the disclosure, the second predicted ephemeris is only valid for a period of approximately 28 days.

At 410, the GNSS positioning system 112 receives, by a RF module, satellite signals from a sufficient number of GNSS satellites and extracts current broadcast orbit data and clock states from the satellite signals. At 420, the GNSS positioning system 112 checks whether the real broadcast orbit data is available. If the real broadcast orbit data from any visible satellites is not available to the GNSS positioning system 112, the process proceeds to 430; otherwise, the process proceeds to 470.

At 430, the ephemeris selector 116 selects a predicted ephemeris from both the first predicted ephemeris and the second predicted ephemeris. The predicted ephemeris can be selected based on the validity interval check. The validity interval check is performed based on the comparison of a first threshold interval with the period of validity of the first predicted ephemeris and the comparison of a second threshold interval with the period of validity of the second predicted ephemeris. The threshold interval, which takes into account the accuracy of orbit data prediction, may be predetermined according to a series of empirical experiments. In an example, the first threshold interval is a time (e.g., 2 days) within the period of validity of the first predicted ephemeris (i.e., within approximately 14 days). In another example, the second threshold interval is a time (e.g., 20 days) within the period of validity of the second predicted ephemeris (i.e., approximately 28 days).

At 440, the ephemeris selector 116 determines whether the validity interval check is verified. In an example, the validity interval check is verified when the period of validity of the first predicted ephemeris is less than a first threshold interval and the period of validity of the second predicted ephemeris is not less than a second threshold interval. When the validity interval check is verified, the ephemeris selector 116 selects the first predicted ephemeris as input to the GNSS positioning system at 450; otherwise, the ephemeris selector 116 selects the second predicted ephemeris as input to the GNSS positioning system at 460.

According to an embodiment of the disclosure, when the period of validity of the first predicted ephemeris is less than a first threshold interval and the period of validity of the second predicted ephemeris is not less than a second threshold interval, the GNSS positioning system 112 uses the first predicted ephemeris (i.e., the selected predicted ephemeris) in conjunction with the pseudo-range data derived from the ranging signals associated with the visible satellites to determine a position for the GNSS-enabled device 110. According to another embodiment of the disclosure, when the period of validity of the first predicted ephemeris is not less than a first threshold interval and the period of validity of the second predicted ephemeris is less than a second threshold interval, the GNSS positioning system 112 uses the second predicted ephemeris (i.e., the selected predicted ephemeris) in conjunction with the pseudo-range data derived from the ranging signals associated with the visible satellites to determine a position for the GNSS-enabled device 110.

At 470, the GNSS positioning system 112 uses the real broadcast orbit data from visible satellites in conjunction with the pseudo-range data derived from the ranging signals associated with the visible satellites to determine a position for the GNSS-enabled device 110. The process proceeds to 499 and terminates.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

According to some embodiments, a mobile device includes: a data generation module, an ephemeris prediction module, an ephemeris selection module, and a positioning engine. The data generation module is configured to generate first assistance data for positioning determination based at least in part on broadcast ephemeris data associated with one or more satellites. The ephemeris prediction module is configured to: in response to the mobile device not having access to a communication network, generate first predicted ephemeris data associated with the one or more satellites based at least in part on the first assistance data; and in response to the mobile device having access to the communication network, generate the second predicted ephemeris data based at least in part on second assistance data from a server in the communication network, the second assistance data being related to precise ephemeris data associated with the one or more satellites. The ephemeris selection module is configured to select a predicted ephemeris from the first predicted ephemeris and the second predicted ephemeris base at least in part on the validity interval check. The positioning engine is configured to perform positioning determination based at least in part on the selected predicted ephemeris data.

For example, the mobile device further includes: a communication component configured to send an assistance-data request to the server in response to a difference between a current time and a last request time exceeding a threshold. The server transmits the second assistance data in response to the assistance-data request. As an example, the positioning engine is further configured to acquire position-related data, velocity-related data or timing-related data based at least in part on the predicted ephemeris data. As another example, the second assistance data includes one or more of the following: orbit data, clock data and earth-orientation-parameter (EOP) data.

According to certain embodiments, a system for positioning determination for a mobile device includes: an orbit data generator configured to generate orbit data based at least in part on precise ephemeris data associated with one or more satellites; a clock data generator configured to generate clock data based at least in part on clock records associated with the one or more satellites; an earth-orientation-parameter (EOP) data generator configured to generate EOP data based at least in part on EOP information; and a communication component configured to, in response to an assistance-data request from a mobile device, transmit the orbit data, the clock data and the EOP data to the mobile device so that the mobile device can perform ephemeris prediction for positioning determination.

For example, the orbit data generator is further configured to: obtain the precise ephemeris data associated with the one or more satellites; convert the precise ephemeris data from a set of Earth-Centered-Earth-Fixed (ECEF) coordinates to a set of Earth-Centered-Inertial (ECI) coordinates; generate a set of original satellite initial conditions; iteratively estimate satellite initial conditions based at least in part on the set of original satellite initial conditions until a convergence is reached; and generate the orbit data based at least in part on the estimated satellite initial conditions. As an example, the estimated satellite initial conditions include: data related to initial orbital positions, velocity-related data, and one or more initial orbital parameters. As another example, the clock data generator is further configured to: obtain the clock records associated with the one or more satellites; filter the clock records using median absolute deviation; and estimate the clock data according to a prediction model based at least in part on the filtered clock records. As yet another example, in the EOP data generator is further configured to: obtain the EOP information; filter the EOP information; and estimate the EOP data according to a prediction model based at least in part on the filtered EOP information. For example, the system further includes: a reception component configured to receive the precise ephemeris data, the clock records, and the EOP information from a Global-Navigation-Satellite-Systems (GNSS) information provider.

According to some embodiments, a method is provided for positioning determination for a mobile device. The method includes: generating first assistance data for positioning determination based at least in part on broadcast ephemeris data associated with one or more satellites; in response to a mobile device not having access to a communication network, generating first predicted ephemeris data associated with the one or more satellites based at least in part on the first assistance data; in response to the mobile device having access to the communication network, generating second predicted ephemeris data based at least in part on second assistance data from a server in the communication network, the second assistance data being related to precise ephemeris data associated with the one or more satellites; selecting a predicted ephemeris from the first predicted ephemeris and the second predicted ephemeris base at least in part on the validity interval check; and performing positioning determination for the mobile device based at least in part on the predicted ephemeris data. For example, the method further includes: sending an assistance-data request to the server in response to a difference between a current time and a last request time exceeding a threshold. The server transmits the second assistance data in response to the assistance-data request. As an example, the method further includes: acquiring position-related data, velocity-related data or timing-related data based at least in part on the predicted ephemeris data. As another example, the second assistance data includes one or more of the following: orbit data, clock data and earth-orientation-parameter (EOP) data.

According to certain embodiments, a method is provided for positioning determination for a mobile device. The method includes: generating orbit data based at least in part on precise ephemeris data associated with one or more satellites; generating clock data based at least in part on clock records associated with the one or more satellites; generating earth-orientation-parameter (EOP) data based at least in part on EOP information; and transmitting the orbit data, the clock data and the EOP data to a mobile device in response to an assistance-data request from the mobile device, so that the mobile device can perform ephemeris prediction for positioning determination. For example, the method further includes: obtaining the precise ephemeris data associated with the one or more satellites; converting the precise ephemeris data from a set of Earth-Centered-Earth-Fixed (ECEF) coordinates to a set of Earth-Centered-Inertial (ECI) coordinates; generating a set of original satellite initial conditions; iteratively estimating satellite initial conditions based at least in part on the set of original satellite initial conditions until a convergence is reached; and generating the orbit data based at least in part on the estimated satellite initial conditions. As an example, the estimated satellite initial conditions include one or more of the following: data related to initial orbital positions, velocity-related data, and one or more initial orbital parameters. As another example, the method further includes: obtaining the clock records associated with the one or more satellites; filtering the clock records using median absolute deviation; and estimating the clock data according to a prediction model based at least in part on the filtered clock records. As yet another example, the method further includes: obtaining the EOP information; filtering the EOP information; and estimate the EOP data according to a prediction model based at least in part on the filtered EOP information.

What is claimed is:

1. A method comprising:
   receiving, by a mobile device, broadcast orbit data and clock states from satellites;
   producing, by the mobile device, first assistance data for the satellites based on the broadcast orbit data and clock states;
   producing, by the mobile device, a first predicted ephemeris for the satellites based on the first assistance data;
   receiving, by the mobile device, second assistance data from a server system, wherein the second assistance data is produced by the server system from precise orbit data and accurate clock states that are received from the satellites;
   producing, by the mobile device, a second predicted ephemeris for the satellites based on the received second assistance data; and
   selecting, by the mobile device, one of the first predicted ephemeris and the second predicted ephemeris based on
   (i) comparing a period of validity of the first predicted ephemeris to a first threshold, and
   (ii) comparing a period of validity of the second predicted ephemeris to a second threshold different than the first threshold.

2. The method of claim 1, further comprising:
   calculating, by the mobile device, a position for the device based on the selected predicted ephemeris.

3. The method of claim 2, wherein calculating of the position is further based on positions and velocities derived from the selected predicted ephemeris and pseudo-range data.

4. The method of claim 1, wherein the selecting includes:
   selecting the first predicted ephemeris based on the period of validity of the first predicted ephemeris being less than the first threshold; and
   selecting the second predicted ephemeris based on the period of validity of the second predicted ephemeris being less than the second threshold.

5. The method of claim 1, wherein receiving of the second assistance data from the server system is through a cellular communication network.

6. The method of claim 1, wherein producing the first assistance data includes:
   producing first orbit data by (i) generating initial orbital dynamic parameters and an initial set of orbital positions and velocities, and (ii) iteratively estimating orbital conditions and orbital dynamic parameters through numerical integration of a satellite equation of motion using force models; and
   producing first clock data by (i) generating an initial set of clock states, and (ii) estimating clock states using a quadratic polynomial model.

7. The method of claim 1, wherein producing the first predicted ephemeris includes:
   producing a first predicted orbit by (i) predicting orbits of the satellites by numerically integrating satellite equations of motion based on first orbit data, and (ii) converting the predicted orbits from an Earth-Centered-Inertial (ECI) coordinate system to an Earth-Centered-Earth-Fixed (ECEF) Cartesian coordinate system;

producing a first predicted clock by calculating future clock states of the satellites based on a quadratic polynomial and first clock data; and formatting the first predicted orbit and the first predicted clock in a same representation as broadcast ephemerides.

8. The method of claim 1, further comprising:

receiving, by the server system, the precise orbit data and accurate clock states for the satellites;

producing, by the server system, the second assistance data for the satellites based on the received precise orbit data and accurate clock states; and sending the second assistance data to the mobile device.

9. The method of claim 8, wherein producing the second assistance data includes:

producing second orbit data by (i) generating initial orbital dynamic parameters and an initial set of orbital position and velocity conditions, and (ii) iteratively estimating orbital conditions and orbital dynamic parameters through numerical integration of a satellite equation of motion using force models;

producing second clock data by (i) generating an initial set of clock states, and (ii) estimating the accurate clock states using a quadratic polynomial model; and producing second EOP data by (i) generating an initial set of Earth Orientation Parameter (EOP) values, and (ii) estimating accurate EOP values using a polynomial model, wherein the EOP values include a polar motion X, a polar motion Y, a length of day (LOD), and Coordinated Universal Time-Universal Time (UT1-UTC).

10. The method of claim 1, wherein producing the second predicted ephemeris includes:

producing a second predicted orbit by (i) predicting orbits of the satellites by numerically integrating satellite equations of motion based on second orbit data, and (ii) converting the predicted orbits from an Earth-Centered-Inertial (ECI) coordinate system to an Earth-Centered-Earth-Fixed (ECEF) Cartesian coordinate system;

producing a second predicted clock by (i) predicting clock states of the satellites based on a quadratic polynomial in time and second clock data; and formatting the second predicted orbit and the second predicted clock in a same representation as a broadcast ephemeris.

11. A mobile device comprising:

a receiver configured to receive broadcast orbit data and clock states from satellites;

a data generator configured to produce first assistance data for the satellites based on the broadcast orbit data and clock states;

a transceiver configured to receive second assistance data from a server system, wherein the second assistance data is produced by the server system from precise orbit data and accurate clock states that are received from the satellites;

an ephemeris predictor configured to produce (i) a first predicted ephemeris for the satellites based on the first assistance data, and (ii) a second predicted ephemeris for the satellites based on the received second assistance data; and an ephemeris selector configured to select one of the first predicted ephemeris and the second predicted ephemeris based on
(i) comparing a period of validity of the first predicted ephemeris to a first threshold, and
(ii) comparing a period of validity of the second predicted ephemeris to a second threshold different than the first threshold.

12. The mobile device of claim 11, further comprising a processor configured to calculate a position for the device based on the selected predicted ephemeris.

13. The mobile device of claim 11, wherein the processor is configured to calculate the position based on positions and velocities derived from the selected predicted ephemeris and pseudo-range data.

14. The mobile device of claim 11, wherein the selecting includes:

selecting the first predicted ephemeris based on the period of validity of the first predicted ephemeris being less than the first threshold; and selecting the second predicted ephemeris based on the period of validity of the second predicted ephemeris being less than the second threshold.

15. The mobile device of claim 11, wherein the transceiver is configured to receive the second assistance data from the server system through a cellular communication network.

16. A non-transitory processor-readable medium storing instructions that are configured to be executed by a processor to:

receive broadcast orbit data and clock states from satellites;

produce first assistance data for the satellites based on the broadcast orbit data and clock states;

produce a first predicted ephemeris for the satellites based on the first assistance data;

receive second assistance data from a server system, wherein the second assistance data is produced by the server system from precise orbit data and accurate clock states that are received from the satellites;

produce a second predicted ephemeris for the satellites based on the received second assistance data; and select one of the first predicted ephemeris and the second predicted ephemeris based on
(i) comparing a period of validity of the first predicted ephemeris to a first threshold, and
(ii) comparing a period of validity of the second predicted ephemeris to a second threshold different than the first threshold.

17. The processor-readable medium of claim 16, wherein the instructions are configured for the processor to calculate a position for the device based on the selected predicted ephemeris.

18. The processor-readable medium of claim 16, wherein the instructions are configured for the processor to calculate the position based on positions and velocities derived from the selected predicted ephemeris and pseudo-range data.

19. The processor-readable medium of claim 16, wherein the selecting includes:

selecting the first predicted ephemeris based on the period of validity of the first predicted ephemeris being less than the first threshold; and selecting the second predicted ephemeris based on the period of validity of the second predicted ephemeris being less than the second threshold.

20. The processor-readable medium of claim 16, wherein the instructions are configured to receive the second assistance data from the server system through a cellular communication network.

* * * * *